United States Patent [19]

Hales et al.

[11] Patent Number: 4,943,865

[45] Date of Patent: Jul. 24, 1990

[54] METHOD AND SYSTEM FOR RECORDING STANDARD PULSE CODE MODULATED SERIAL DATA USING VIDEO SIGNAL RECORDERS

[75] Inventors: John C. Hales, Renton; Everett J. Nelson, Bellevue, both of Wash.

[73] Assignee: The Boeing Company, Seattle, Wash.

[21] Appl. No.: 105,574

[22] Filed: Oct. 8, 1987

[51] Int. Cl.$^5$ ............................................. H04N 5/782
[52] U.S. Cl. ...................................... 358/335; 360/9.1; 360/32; 360/64
[58] Field of Search ............................ 369/30, 32, 59; 358/341, 342, 335; 360/9.1, 10.3, 19.1, 32, 33.1, 64

[56] References Cited

U.S. PATENT DOCUMENTS

| | | | |
|---|---|---|---|
| 4,030,129 | 6/1977 | Whitlock | 360/8 |
| 4,138,694 | 2/1979 | Doi et al. | 360/8 |
| 4,206,476 | 6/1980 | Hashimoto | 360/8 |
| 4,224,642 | 9/1980 | Mawatari et al. | 360/32 |
| 4,246,615 | 1/1981 | Shiraishi et al. | 360/32 |
| 4,254,500 | 3/1981 | Brookhart | 360/32 |
| 4,274,115 | 6/1981 | Wada et al. | 360/32 |
| 4,281,355 | 7/1981 | Wada et al. | 360/32 |
| 4,282,551 | 8/1981 | Kanazawa et al. | 360/32 |
| 4,287,533 | 9/1981 | Schwab et al. | 360/33.1 |
| 4,295,154 | 10/1981 | Hata et al. | 360/19.1 |
| 4,309,726 | 1/1982 | Tanaka et al. | 360/32 |
| 4,356,517 | 10/1982 | Ozaki et al. | 360/32 |
| 4,403,263 | 9/1983 | Kageyama et al. | 360/32 |
| 4,430,675 | 2/1984 | Fujime | 360/9.1 |
| 4,433,415 | 2/1984 | Kojima | 360/32 |
| 4,433,416 | 2/1984 | Kojima | 360/32 |
| 4,468,710 | 8/1984 | Hashimoto et al. | 360/9.1 |
| 4,480,272 | 10/1984 | Horstmann | 360/8 |
| 4,496,997 | 1/1985 | Ohtsuki | 360/32 |
| 4,542,419 | 9/1985 | Morio et al. | 360/32 |
| 4,549,229 | 10/1985 | Nakano et al. | 360/8 |
| 4,587,573 | 5/1986 | Odaka | 360/19.1 |
| 4,602,295 | 7/1986 | Moriyama et al. | 360/19.1 |
| 4,633,331 | 12/1986 | McGrady et al. | 360/32 |

Primary Examiner—Donald McElheny, Jr.
Attorney, Agent, or Firm—Finnegan, Henderson, Farabow, Garrett & Dunner

[57] ABSTRACT

A method and system of recording on a video signal recorder a serialized stream of pulse code modulated digital data bits. The video signal recorder has multiple record/playback heads and is of the type normally adapted to record video signals such as television signals under the control of synchronizing signals included in the video signals. Data frames having a predetermined number of data bits of the serialized stream of pulse code modulated digital data bits are successively applied at a given frequency to a data buffer. The frequency of the data bits of the data frames output from the data buffer is increased thereby compressing in time the data frames. Buffer zones of filler bits provide a predetermined period of time between successive data frames. Synchronizing signals are inserted in the buffer zones for controlling the timing of switching events between recording heads to occur within the predetermined period of time. Frame synchronizing signal codes are also inserted in the buffer zones for locating the data frames during playback. The composite signal including successive buffer zones, with the inserted synchronizing signals and frame synchronizing signal codes, and the compressed data frames are applied to a video signal recorder for recording. Upon play back, the recorded compressed data frames are reconstructed to their original frequency and format as received for recording.

13 Claims, 4 Drawing Sheets

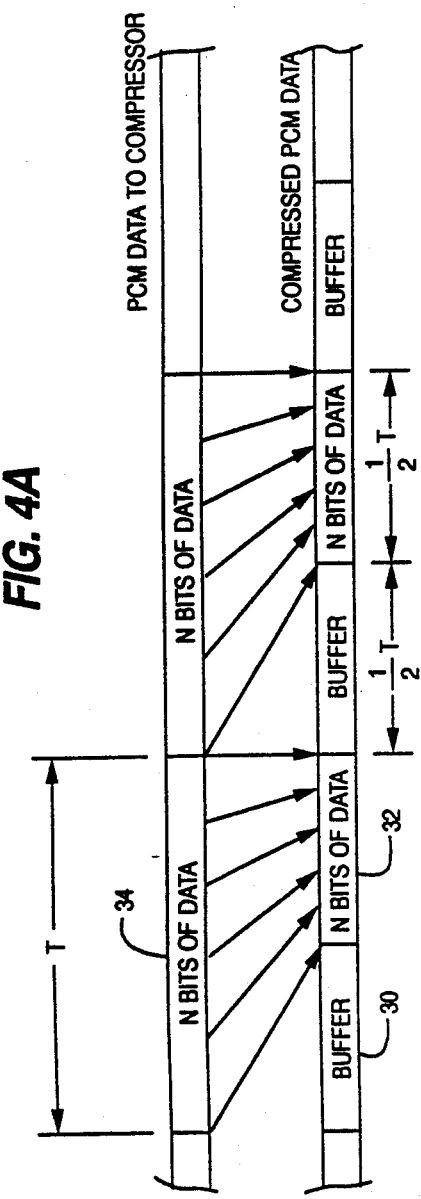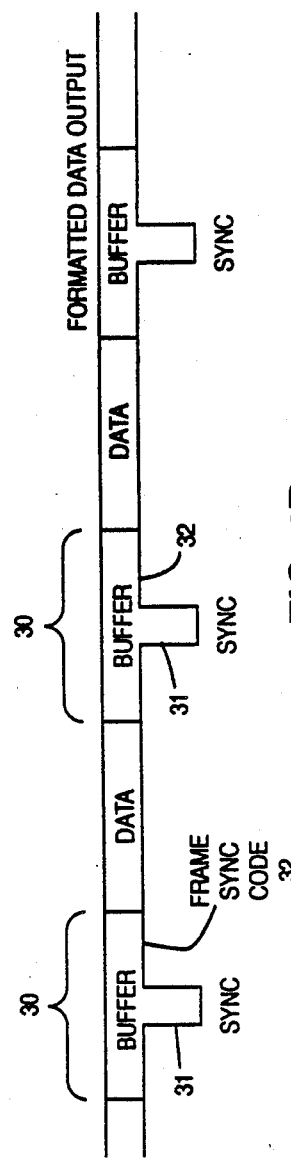
FIG. 4A
FIG. 4B

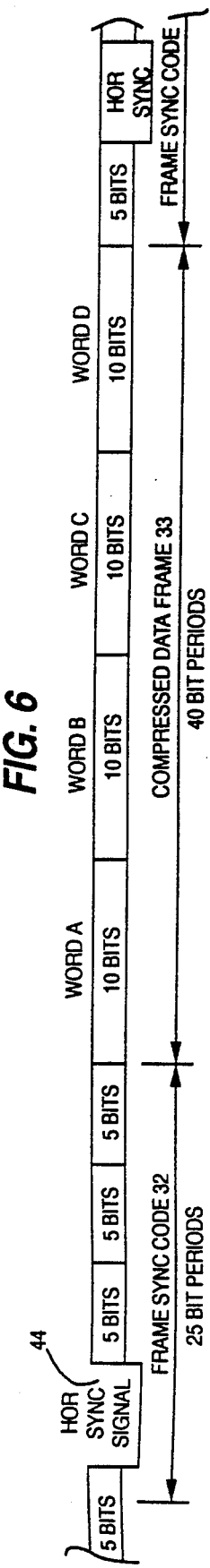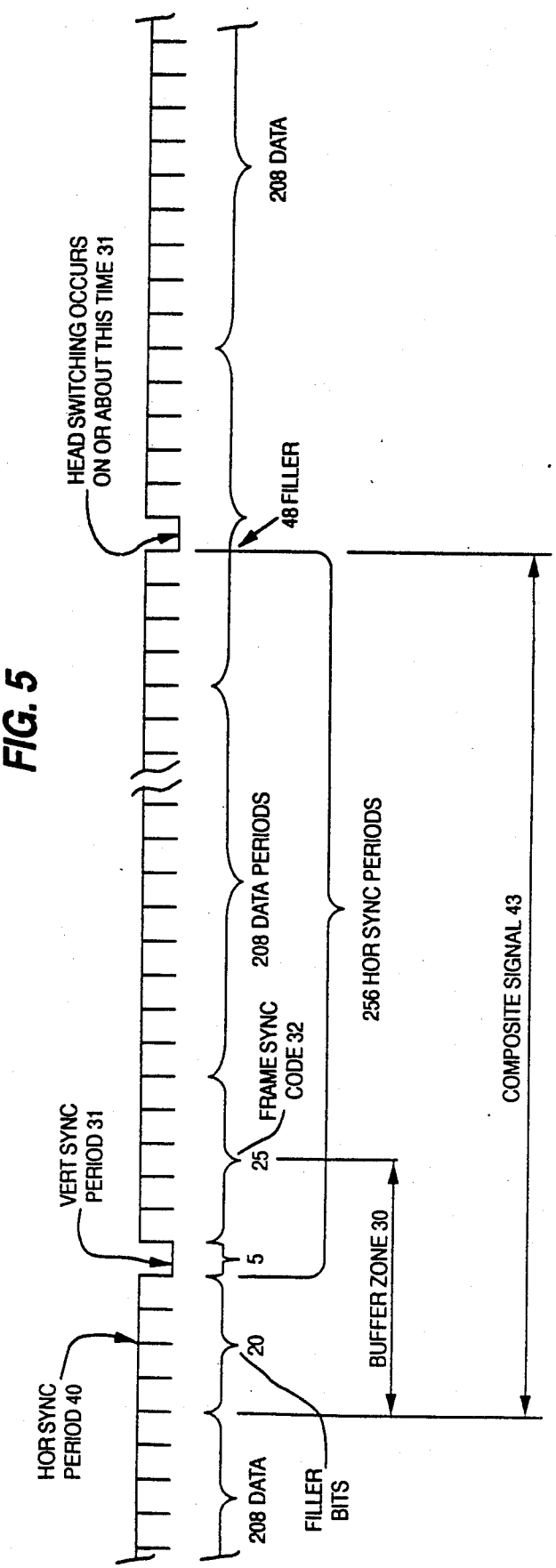

METHOD AND SYSTEM FOR RECORDING STANDARD PULSE CODE MODULATED SERIAL DATA USING VIDEO SIGNAL RECORDERS

FIELD OF THE INVENTION

This invention relates to a method and system for recording and playing back a serialized stream of standard pulse code modulated data using a video signal recorder such as a video cassette recorder.

BACKGROUND OF THE INVENTION

A high performance instrumentation recorder typically has been used to record and playback high frequency standard pulse code modulated (PCM) serial digital data. In general, when analog data is converted to PCM data, it is often serialized into a single bit stream so that the data can be transmitted via a media such as a radio link and can also be recorded on a single channel of a tape recorder. The serialized streams of PCM data, when blocked into groups of words with a marker identifying the start of a group of data words, are called frames of data. The identifying marker is called a frame synchronizing code. A variety of modulation techniques are used to modulate the serialized data bits to improve reliability of the radio transmission and the reproduction of the signal when recorded. These techniques are referred to as PCM codes and are standardized. See, e.g., IRIG STANDARD 106-86 *Telemetry Standards*, ADA089908, published by the Range Commander's Council, U.S. Army White Sands Missile Range, New Mexico (May 1986).

PCM serial data, for example, is developed when testing systems such as guidance controls or sequence events devices which may have hundreds of parameters or events that must be monitored. A substantial test thus may acquire and record data samples taken from several hundred sensors in connection with the device being tested.

Tests of this magnitude may require more than one PCM encoder to convert analog data to digital data and the recorder would therefore utilize more than one record channel (one channel for each PCM data stream) to record all the data. This type of recorder and the associated tapes are usually very expensive. Moreover, these recorders are heavy, bulky, consume significant power and, when used to record high frequency data, are limited to as little as fifteen minutes recording time.

Not all tests require such a large amount of data which necessitates the use of an expensive conventional instrumentation recorder. Many tests require only a single PCM channel. In these circumstances, VCR recorders offer advantages over conventional instrumentation recorders.

VCR's, compared to conventional instrumentation recorders, are relatively inexpensive, small and capable of recording large quantities of data for several hours. However, VCR's have not widely been used in recording standard PCM serial data because of problems with data loss. Specifically, the standard television video format employed by VCR's includes vertical and horizontal synchronizing pulses which cause gaps in the data stream. These gaps create significant data bit dropouts which result in unacceptable losses of data in the recordation of high frequency continuous standard PCM serial data. For example, with the standard video format, a VCR used to record continuous PCM serial data would lose 4.7 microseconds of data every 63.5 microseconds and would further lose 190.5 microseconds of data sixty times a second. This is unacceptable when recording standard PCM serial data that involves a large number of parameters and/or events.

Another problem in using VCR's to record standard PCM serial data results from gaps or discontinuities in the data that may result as it is either being recorded or played back from the recording medium. VCR's use a helical-scan technique for recording where the tape is guided at an angle around the surface of a rotating drum in which the video record/playback heads are mounted. The record/playback heads cross the tape at a gradual angle from edge to edge. Space is left near each edge to record audio and timing signals on regular longitudinal tracks. The path taken by the video heads slants across the tape to form part of a helix.

During the record and playback procedures the video heads alternate from one to the other as they rotate on the drum. Head rotation is synchronized to the 60 Hz vertical synchronizing pulse in the video signal. A single scan of a head past the tape takes 1/60 second. The horizontal synchronizing pulses are used in automatic gain circuits of the VCR.

In an attempt to minimize the discontinuity caused as the recorder switches from one head to the next, an overlap in the data recorded on the tape is provided. That is, there is a period during which the same information recorded by the video head just leaving the tape is also recorded by the video head that is just beginning to make its pass at the tape. Electronic switching is used to change from one video head to the next so that a continuous signal is produced. However, if the heads are not perfectly aligned, the misalignment can cause the insertion of additional gaps or discontinuities in the PCM data as it is either recorded or played back from the tape.

SUMMARY OF THE INVENTION

It is an object of the invention to provide a method and system for recording and playback of standard PCM serial data using a VCR. It is an additional object of the invention to provide for recording on a VCR a composite signal having standard PCM serial data and a buffer zone, with filler data and synchronizing signals to control video head switchover during recording and playback being included in the buffer zone, to prevent loss of PCM data during switchover.

Additional objects and advantages of the invention will be set forth in part in the description which follows, and in part will be obvious from the description, or may be learned by practice of the invention. The objects and advantages of the invention may be realized and attained by means of the methods, instrumentalities and combinations particularly pointed out in the appended claims.

To achieve these and other objects and in accordance with the purpose of the invention, as embodied and broadly described herein, there is provided a method of recording on a video signal recorder a serialized stream of pulse code modulated digital data bits, the video signal recorder having multiple record/playback heads and being of the type normally adapted to record video signals such as television signals under the control of synchronizing signals included in the video signals, said method comprising the steps of: developing successive data frames having a predetermined number of data bits of the serialized stream of pulse code modulated digital data bits occurring at a given frequency rate; compressing the time duration of the data frames forming time compressed data frames; developing buffer zones providing a predetermined period of time between successive data frames; inserting filler bits and synchronizing signals in the buffer zones and controlling the timing of switching events between recording heads to occur within the predetermined period of time; inserting frame synchronizing signal codes in the buffer zones for locating the data frames during playback; and applying as a composite signal the successive buffer zones, including the filler bits and the inserted synchronizing signals and the frame synchronizing signal codes, and the time compressed data frames to a video signal recorder for recording thereby.

In one aspect of the present invention, increasing the frequency of the data bits of the data frames is provided by successively applying data frames having a predetermined number of data bits of the serialized stream of pulse code modulated digital data bits at a given frequency to a data buffer; and increasing the frequency of the data bits of the data frames outputted from the data buffer thereby compressing in time the data frames.

In another aspect of the invention, there is provided a method of playing back from a video signal recorder a recording of a composite signal having successive data frames of a predetermined number of data bits recorded at a fixed frequency from a serialized stream of pulse code modulated digital data bits, and with buffer zones having synchronizing signals and frame synchronizing codes being interposed between successive data frames, the video signal recorder having multiple record/playback heads and being of the type normally adapted to record and playback video signals such as television signals under the control of synchronizing signals included in the video signals, said method comprising the steps of: detecting the frame synchronizing codes to locate the data frames; controlling the record/playback heads with the synchronizing signals to playback the data bits of the located data frames at times other than during switching between the record/playback heads; eliminating the buffer zones and expanding the time duration of the played back data frames to their original time duration prior to being recorded by decreasing the frequency of the played back data bits to their original frequency as received for recording; and reconstructing the original format of the data bits to a serialized stream of pulse code modulated data bits at their original frequency as received for recording.

Another aspect of the invention provides: shifting successive data frames to a shift register and outputting a continuous stream of pulse code modulated data bits at their original frequency received for recording. It is also an aspect of the invention to provide the step of decoding the played back continuous stream of pulse code modulated data bits.

The invention, in one aspect provides a system for recording on a video recorder a serialized stream of pulse code modulated digital data bits, the video signal recorder having multiple record/playback heads and being of the type normally adapted to record video signals such as television signals under the control of synchronizing signals included in the video signals, comprising: means for developing data frames having a predetermined number of data bits occurring at a first frequency from the serialized stream of pulse code modulated digital data bits; means for increasing the frequency of the data bits included in the data frames to a second frequency which is greater than said first frequency for compressing the time duration of the data frames to form time compressed data frames; means for providing a buffer zone between successive time compressed data frames and for inserting in the buffer zones synchronizing signals to control the record/playback heads and frame synchronizing signal codes for locating the data frames during playback; and means to apply as a composite signal successive buffer zones, including the inserted synchronizing signals and the frame synchronizing signal codes, and the time compressed data frames to the video signal recorder for recording thereby.

In another aspect of the invention, there is provided a system wherein the means for increasing the frequency of the data bits included in the data frames to form the time compressed data frames comprise: a first shift register to receive serially at the first frequency the data bits comprising successive data frames; a data buffer to receive in parallel the contents of the first shift register; and a second shift register, the data buffer operating to shift its contents to the second shift register for outputting by the second shift register at the second frequency which is greater than said first frequency for compressing the time duration of the data frames.

The invention in another aspect also provides a system for playing back from a video signal recorder a recording of a composite signal having successive data frames of a predetermined number of data bits recorded at a fixed frequency from a serialized stream of pulse code modulated digital data bits, and with buffer zones having synchronizing signals and frame synchronizing codes being interposed between successive data frames, the video signal recorder having multiple record/playback heads and being of the type normally adapted to record and playback video signals such as television signals under the control of synchronizing signals included in the video signals, comprising: means for detecting the frame synchronizing codes to locate the data frames; means for controlling the record/playback heads by the synchronizing signals to playback the data bits of the located data frames at times other than during switching between the record/playback heads while eliminating the buffer zones; mean to expand the time duration of the played back data frames to their original time duration prior to being recorded by decreasing the frequency of the played back data bits from the fixed frequency to their original frequency received for recording; and means to reconstruct the format of the data bits to a serialized stream of pulse code modulated data bits at their original frequency as received for recording.

Another aspect of the invention is the provision of decoding means to decode the reconstructed serialized stream of pulse code modulated data bits.

In yet another aspect, the invention provides as means to expand the time duration of the played back data frames a first shift register for receiving serially the played back data frames at the fixed frequency; a data buffer connected to receive in parallel the contents of the first shift register; and a second shift register connected to receive the contents of the second shift register in parallel at the original frequency of the data bits before being recorded and provide a serialized stream of pulse code modulated data bits at the original frequency at its output, and decoding means connected to receive the output of the second shift register to decode the played back stream of pulse code modulated data bits.

The accompanying drawings which are incorporated herein and constitute part of the specification, illustrate embodiments of the invention and, together with the description, serve to explain the principles of the invention.

BRIEF DESCRIPTION OF THE DRAWINGS

FIGS. 4A and 4B are timing diagrams of the composite signal shown in FIG. 3 further illustrating successive buffer zones and compressed data frames in accordance with the embodiment of the invention shown in FIGS. 1, 2 and 7;

FIG. 5 is a timing diagram showing the composite signal of FIGS. 3 and 4 in video type format;

FIG. 6 is a timing diagram showing the format of the frame synchronizing signal code and compressed data frame portions of the composite signal of FIGS. 3, 4A, 4B and 5.

DETAILED DESCRIPTION OF THE PREFERRED EMBODIMENTS

Reference will now be made in detail to the preferred embodiments of the invention, examples of which are illustrated in the accompanying Drawings.

Figure 1:
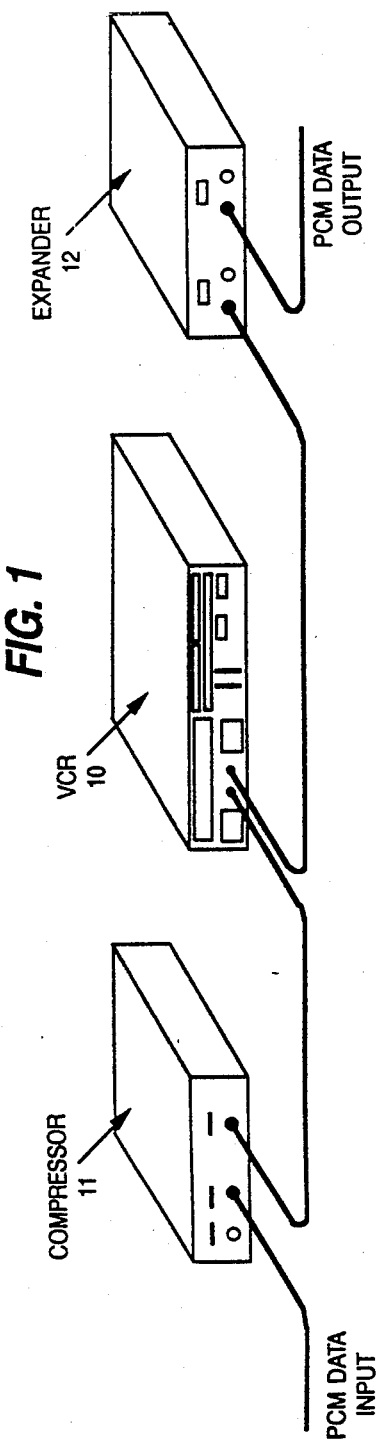
FIG. 1 is a block diagram illustrating the compressor and expander devices used in conjunction with a VCR for recording and playback of standard PCM serial data in accordance with the present preferred embodiment of the invention.

In accordance with the invention, a system for using a VCR to record and playback standard PCM serial data is shown in FIG. 1. VCR 10 is a standard VCR which may be either VHS or BETA formatted.

The VCR method and system in accordance with the invention does not look at and does not acknowledge the presence of synchronizing codes or word boundaries in the PCM data frame. It treats the incoming PCM serial data as a single stream of data bits having no perceivable intelligence. The data is shifted into a compressor at one frequency rate and shifted out in a time compressed data frame at a higher frequency rate. As explained hereafter, this creates time gaps between successive compressed data frames which are used for buffer zones in which synchronizing signals and other control signals are inserted before recordation by VCR 10.

Each compressed PCM serial data frame is tagged with a frame synchronizing code which is later used during playback to flag an expander circuit that a compressed data frame is about to be played back, thereby locating the data. The expander extracts the frame synchronizing code and returns the compressed PCM serial data to its original frequency and serial format. The frame synchronizing code is independent from the PCM synchronizing code, the latter being used to decode or demodulate the PCM serial data.

No modifications to the VCR are required in accordance with the invention. FIG. 1 shows that, in accordance with the invention, standard PCM serial data is input to compressor 11 which produces a composite signal including the compressed data frames and the buffer zones which are applied to a standard VCR 10 for recording. During the playback operation, the recorded composite signal is played back by VCR 10 and applied to expander 12 for reconstruction of the standard PCM serial data initially input to compressor 11.

For a VCR to reliably record standard PCM serial data, the effect on the data caused by both the switching of the heads and the multiplexing in of the video type synchronizing signals must be eliminated. This is accomplished in accordance with the invention as now explained.

Figure 2:
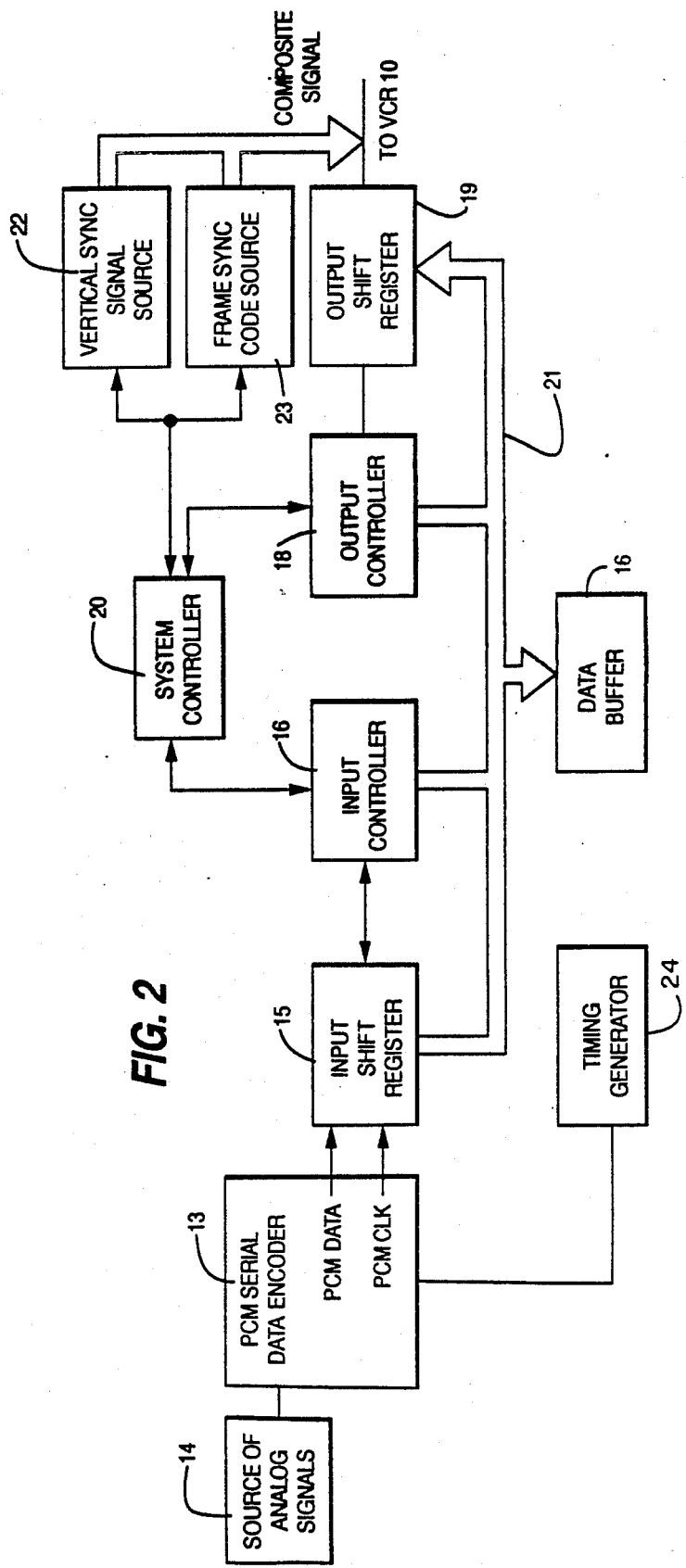
FIG. 2 is a block diagram of a system incorporating the present preferred embodiment of the invention for the recordation of standard PCM serial data.
Figure 3:
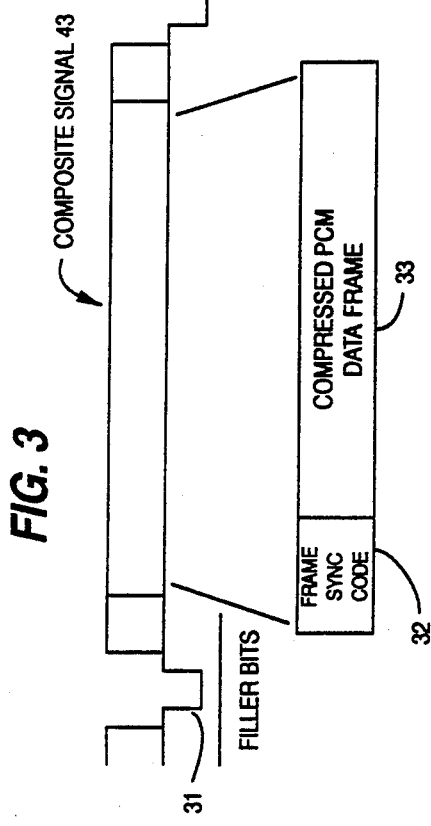
FIG. 3 is a timing diagram representing the composite signal recorded in accordance with the embodiment of the invention shown in FIGS. 1 and 2.

FIG. 2 is a block diagram of the PCM data compression circuit which illustrates the method and system of the invention. Analog signals are applied to PCM serial data encoder 13 from a source of analog signals 14 being tested o monitored. Source 14 may have a multiplicity of parameters or events that are to be monitored.

By way of example, it is known to sample in multiplex fashion a multiplicity of sensors responsive to different parameters or events and obtain corresponding analog signals which are then converted to form a stream of digitally encoded PCM serial data. PCM data encoder 13 which is connected to a source of analog signals 14 provides such a continuous stream of standard PCM serial digital data which is applied to the data compression circuit shown in FIG. 2. The PCM data input from PCM encoder 13 does not have to conform to any rigid format that ties the frame or word boundaries of the PCM data to the synchronization of video type synchronizing signals. The only tie between the VCR 10 and the PCM data output from encoder 13 is between the encoder's output data clock and the synchronizing signals which are inserted into the composite signal shown in FIGS. 3, 4A, 4B and 5 to provide as explained hereafter appropriate timing signals that will provide adequate control for the VCR.

In accordance with the invention, buffer zones are created between successive compressed frames of PCM data to provide predetermined periods of time where filler data, vertical synchronizing signals and frame synchronizing codes are inserted. The purpose of the buffer zones is to provide a period of time during which switching of the record/playback heads may occur without affecting valid PCM serial data. To create the extra time required by the buffer zones, the frequency of the PCM data is increased thereby compressing the time slot which a given number of PCM data bits in a data frame occupy.

As shown in FIG. 2, the PCM data encoder 13 inputs PCM serial data to input shift register 15. For illustrative purposes, it will be assumed that the PCM data from encoder 13 is applied to input shift register 15 at a frequency of 500 K-Bits/sec and that the data compression circuit of FIG. 2 compresses the data and provides output data at twice the input frequency, i.e., 1 M-Bit/sec.

This is accomplished by shifting the serial contents of input shift register 15 in parallel into at a buffer 16 and temporarily storing it in the data buffer until it can be output. The compression circuit has three (3) controllers, each operating at the same frequency. As an example, the operation frequency of the controllers can be 4 MHz. The input controller 17 monitors the data serial to parallel conversion process between input shift register 15 and data buffer 16 and writing the data into memory in data buffer 16. The output controller 18 monitors the reading of data from the memory of data buffer 16 and controls the parallel to serial conversion process between the data in data buffer 16 and the output shift register 19.

System controller 20 acts as a bus switch for data memory bus 21 and the devices connected to it. The system controller 20 tells the input controller 17 and the output controller 18 when to access the memory bus 21 and also controls the insertion of video synchronizing signals and frame synchronizing code signals from their respective sources 22 and 23 into the buffer zones of the composite signal which is output from output shift register 19 to VCR 10, as explained hereafter.

In operation, PCM serial data encoder 13 applies serial data to input shift register 15. The serial data stored in input shift register 15 is shifted out in parallel, in 10 bit word intervals for example, into data buffer 16 via data memory bus 21 under the control of input controller 17. The data buffer 16 comprises a memory sufficient to store a number of data bits which enables the continuing parallel shifting out of data from data buffer 16 to output shift register 19, taking into account that the parallel shifting of data from input register 15 to data buffer 16 is at a slower rate (one-half according to the example) compared to the parallel shifting out of data from data buffer 16 to output shift register 19.

As an example, data buffer 16 may have a memory capable of storing 100 words of data at 10 bits per word. Because the bit rate of data coming out of data buffer 16 is faster than the bit rate of data going into the data buffer, the output data is compressed in time, thus creating additional time for the buffer zones for filler data, vertical synchronizing signals and frame synchronizing codes to be inserted between successive frames of compressed data. The described shifting procedure is continued successively as the PCM serial data bits are applied to input shift register 15 and are ultimately outputted as frames of compressed PCM serial data from output shift register 19.

Figure 7:
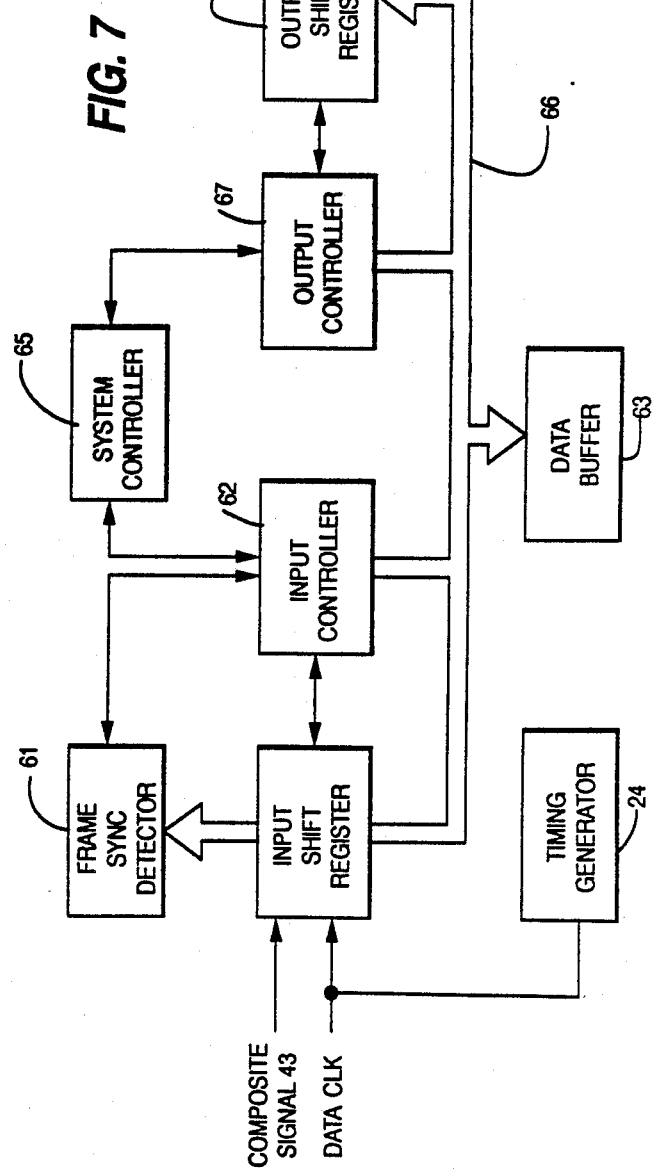
FIG. 7 is a block diagram of the embodiment of the invention for playback of recorded standard PCM serial data.

The data compression circuit shown in FIG. 2 also includes timing generator 2 which supplies the system clock for the various elements of the data compression circuit of FIG. 2, the expander circuit shown in FIG. 7 and the PCM encoder 13. This is done in order that the encoder and the compression and expander circuits are phase locked to the same clock for synchronization.

The result of compressing the PCM data input and creating buffer zones is shown in FIGS. 3, 4A, 4B and 5. In accordance with the invention, the buffer zones 30 comprise predetermined periods of time wherein filler bits including vertical synchronizing signals 31 and frame synchronizing codes 32 are inserted between successive frames of compressed PCM data 33 such that switching of the VCR record/playback heads occurs within the buffer zone without affecting the PCM serial data. The buffer zones 30 are created by increasing the frequency of the PCM serial data 34 applied to the compressor circuit of FIG. 2, thereby compressing its effective time duration. This allows the PCM serial data to be transmitted in relatively shorter periods of time, thereby providing time slots for the buffer zones to occupy between successive frames of compressed PCM serial data 33. FIG. 4 shows, as an example, that there may be "M" bits of PCM serial data per frame which occupy time T before compression and time ½T after compression. The buffer zones 30 occupy the remaining time ½T which results from the compression process.

These relative times are given only as an example and the invention is not limited thereto.

The video type vertical and horizontal synchronizing signal required for record/playback head switching are inserted under the control of system controller 20 into the buffer zone at the output of output shift register 19 without causing any loss of PCM serial data. FIG. 2 shows the vertical synchronizing signal source 22 under the control of system controller 20 being operative to apply vertical synchronizing signals to the output of output shift register 19 to be included as part of the composite signal. Frame synchronizing codes 32 which may include the horizontal synchronizing signals are inserted into the buffer zones 30 from frame synchronizing source 23 under the control of system controller 20, before each frame of compressed PCM serial data, at the output of output shift register 19, to also form part of the composite signal. The frame synchronizing codes 32 locate the data during playback so that the data can be returned to its original serial format 34, as described hereafter.

In addition to creating the buffer zones, the method and system in accordance with the invention developes a PCM serial data timing format that is compatible with recordation by a VCR which normally operates on standard television video signals. Unlike a conventional PCM serial data recorder, both horizontal and vertical synchronizing (timing) signals are required to maintain proper relation of the VCR heads.

The standard television video signal is composed of vertical synchronizing signals having a frequency of 60 Hz and horizontal synchronizing signals having a frequency of approximately 15.7 KHz. In accordance with the invention, the compression circuit generates a composite signal which is similar to television video signals but differs therefrom where necessary to be more compatible with PCM serial data. The following gives a comparison of the relative timing requirements of standard television video signals and the composite signal provided in accordance with the invention.

Standard Television Video Timing vs PCM Data Timing

| Standard Television Video Timing vs PCM Data Timing | | |
|---|---|---|
| | Video | PCM |
| Vertical Sync: | | |
| Pulse Width | 190.5 usec | 200.0 usec |
| Period | 16.66 msec | 16.64 msec |
| | (60.000 Hz) | (60.096 Hz) |
| Horizontal Sync: | | |
| Pulse Width | 4.7 usec | 5.0 usec |
| Period | 63.5 usec | 65.0 usec |
| Horizontal Periods per Vertical Period | 262.5 prds | 256.0 prds |

As shown in FIG. 5, the PCM compression circuit generates 256 horizontal synchronizing periods 40 for every vertical synchronizing period 31. Actual PCM serial data is placed in 208 of the horizontal synchronizing periods 40 as compressed data frames 33. The remaining 8 horizontal synchronizing periods comprise the buffer zone 30 during which record/playback head switching events occur. The relative timing of the signals comprising the composite signal is shown in FIG. 5. Each composite signal frame 43 comprises a buffer zone having 20 horizontal synchronizing periods of filler bits, followed by 3 horizontal synchronizing periods for the vertical synchronizing signals, followed by 25 horizontal synchronizing periods for the frame synchronizing code 32 and, then, 208 synchronizing periods for the compressed data.

Head switching events occur at or about the time of vertical synchronizing signals 31. With the buffer zone lasting 48 horizontal periods for a total of 2.9 milliseconds, the head switching events thus have sufficient time to be completed without endangering the PCM data.

As an example but without limiting the scope of the invention, FIG. 6 illustrates the format of the frame synchronizing code signals 32 and the compressed PCM serial data frames 33. The compression circuit of FIG. 2 takes 40 bits of PCM serial data and inserts them in 10 bit word intervals by parallel shifting data bits from data buffer 16 to output shift register 19 following a frame synchronizing code signal 32. Each horizontal synchronizing signal 44, as shown in FIG. 6, may be part of a frame synchronizing code signal 32. As explained above, the frame synchronizing code signals 32 are used to locate or tag the compressed PCM data frames 33 during playback and thus provide for the PCM serial data to be returned to its original noncompressed serial format.

Each frame synchronizing code signal 32 is 25 bits or 5 bytes long where each byte contains 5 bits and where the horizontal synchronizing signal 44 includes 5 bits. FIG. 6 illustrates in accordance with the example how the four 10 bit data words A-D (40 bit periods) which comprise a compressed PCM data frame 33 are timed relative to the horizontal synchronizing signal 44 and the associated frame synchronizing code signal 32.

In the compressor circuit of FIG. 2, the frequency of the PCM data was increased by a specific amount. In the expander circuit of FIG. 7, the frequency is reduced by the same amount and the compressed PCM serial data is returned to its original frequency and format prior to having been recorded.

FIG. 7 shows the expander circuit which is almost identical in structure to the compressor circuit of FIG. 2. The timing generator 24, as described earlier, provides the synchronizing clock signals. The composite signal 43 including the buffer zones 30 and the compressed PCM serial data frames 33 that have been played back by the VCR 10 is applied to the input shift register 60. Synchronizing detector 61 detects the frame synchronizing code signals 32. Once the synchronizing detector 61 detects a frame synchronizing code signal 32, it informs the input controller 62 which controls the input shift register 60 to read the compressed data frames 33 of 40 data bits, i.e., four words of ten bits each, in parallel into the data buffer 63 for temporary storage. A submultiple of the original frequency of the PCM serial data before recording is then used to load in parallel in 10 bit words the data in data buffer 63 to output shift register 64 under the control of output controller 67. System controller 65 acts as a bus switch for data memory bus 66 and the devices connected to it. System controller 65 tells input and output controllers 62 and 67 when to access memory bus 66. The reading of data from data buffer 63 to output shift register 64 is a continuing process resulting in the reconstruction of the original continuous serial format and frequency of the PCM data that was applied to VCR 10 for recording.

The circuit of FIG. 7 thus expands the time duration of the played back compressed PCM data to its original time duration T while eliminating the buffer zones. The reconstructed original PCM serial data may then be applied to a PCM data decoder (not shown) to demodulate the PCM data and derive the serialized stream of digital data bits corresponding to the analog data that was being sampled for recording.

It will be further apparent to those skilled in the art that various modifications and variations can be made to the instant invention without departing from the scope or spirit of the invention, and it is intended that the present invention cover the modifications and variations provided that they come within the scope of the appended claims and their equivalents.

What is claimed is:

1. A method of recording on a video signal recorder a serialized stream of pulse code modulated digital data bits, the video signal recorder having multiple record/playback heads and being of the type normally adapted to record video signals such as television signals under the control of vertical and horizontal synchronizing signals included in the video signals, said method comprising the steps of:

successively applying data frames having a predetermined number of data bits of the serialized stream of pulse code modulated digital data bits at a given frequency to a data buffer;

increasing the frequency of the data bits of the data frames outputted from the data buffer thereby compressing in time the data frames;

developing buffer zones of filler bits providing predetermined periods of time between successive data frames;

inserting in the buffer zones vertical and horizontal synchronizing signals for controlling the timing of switching events between recording heads to occur within the predetermined periods of time and frame synchronizing codes of a predetermined number of bits for locating the data frames during playback wherein the serialized data stream can be recreated; and applying as a composite signal successive buffer zones, including the inserted vertical and horizontal synchronizing signals and frame synchronizing codes, and the compressed data frames to a video signal recorder for recording thereby.

2. A method of recording on a video signal recorder a serialized stream of pulse code modulated digital data bits, the video signal recorder having multiple record/playback heads and being of the type normally adapted to record video signals such as television signals under the control of vertical and horizontal synchronizing signals included in the video signals, said method comprising the steps of:

developing successive data frames having a predetermined number of data bits of the serialized stream of pulse code modulated digital data bits occurring at a given frequency rate;

compressing the time duration of the data frames forming time compressed data frames;

developing buffer zones providing predetermined periods of time between successive data frames;

inserting in the buffer zones vertical and horizontal synchronizing signals for controlling the timing of switching events between recording heads to occur within the predetermined periods of time and frame synchronizing codes of a predetermined number of bits for locating the data frames during playback wherein the serialized data stream can be recreated; and applying as a composite signal the successive buffer zones including the inserted vertical and horizontal synchronizing signals and the frame synchronizing codes, and the time compressed data frames video signal recorder for recording thereby.

3. The method of claim 2 wherein the step of compressing the time duration of the data frames comprises increasing the frequency of the data bits in each data frame.

4. A method of playing back from a video signal recorder a recording of a composite signal having successive data frames of a predetermined number of data bits recorded at a fixed frequency from a serialized stream of pulse code modulated digital data bits, and with buffer zones having vertical and horizontal synchronizing signals and frame synchronizing codes being interposed between successive data frames, the video signal recorder having multiple record/playback heads and being of the type normally adapted to record and playback video signals such as television signals under the control of vertical and horizontal synchronizing signals included in the video signals, said method comprising the steps of:

detecting the frame synchronizing codes to locate the data frames;

controlling the record/playback heads with the vertical and horizontal synchronizing signals to play back the data bits of the located data frames at times other than during switching between record/playback heads;

eliminating the buffer zones and expanding the time duration of the played back data frames to their original time duration prior to being recorded by decreasing the frequency of the played back data bits to their original frequency as received for recording; and reconstructing the original format of the data bits to a serialized stream of pulse code modulated data bits at their original frequency as received for recording.

5. The method of claim 4 where the step of expanding comprises shifting successive data frames to a shift register and outputting a continuous stream of pulse code modulated data bits at their original frequency as received for recording.

6. The method of claim 5 further comprising:
decoding the played back continuous stream of pulse code modulated data bits.

7. The method of claim 4 further comprising:
decoding the played back continuous stream of pulse code modulated data bits.

8. A system for recording on a video recorder a serialized stream of pulse code modulated digital data bits, the video signal recorder having multiple record/playback heads and being of the type normally adapted to record video signals such as television signals under the control of vertical and horizontal synchronizing signals included in the video signals, comprising:

means for developing data frames having a predetermined number of data bits occurring at a first frequency from the serialized stream of pulse code modulated digital data bits;

means for increasing the frequency of the data bits included in the data frames to a second frequency which is greater than said first frequency for compressing the time duration of the data frames to form time compressed data frames;

means for providing a buffer zone between successive time compressed data frames and for inserting in the buffer zones vertical and horizontal synchronizing signals to control the record/playback heads and frame synchronizing codes for locating the data frames during playback wherein the serialized data stream can be recreated; and means to apply as a composite signal successive buffer zones, including the vertical and horizontal synchronizing signals and the frame synchronizing codes, and the time compressed data frames to the video signal recorder for recording thereby.

9. The system of claim 8 wherein the means for increasing the frequency of the data bits included in the data frames to form the time compressed data frames comprise:

a first shift register to receive serially at the first frequency the data bits comprising successive data frames:

a data buffer to receive in parallel the contents of the first shift register; and a second shift register, the data buffer operating to shift its contents to the second shift register for outputting by the second shift register at the second frequency which is greater than said first frequency for compressing the time duration of the data frames.

10. A system for playing back from a video signal recorder a recording of a composite signal having successive data frames of a predetermined number of data bits recorded at a fixed frequency from a serialized stream of pulse code modulated digital data bits, and with buffer zones having vertical and horizontal synchronizing signals and frame synchronizing codes being interposed between successive data frames, the video signal recorder having multiple record/playback heads and being of the type normally adapted to record and playback video signals such as television signals under the control of vertical and horizontal synchronizing signals included in the video signals, comprising:

means for detecting the frame synchronizing codes to locate the data frames;

means for controlling the record/playback heads by the vertical and horizontal synchronizing signals to play back the data bits of the located data frames at times other than during switching between the record/playback heads, while eliminating the buffer zones;

means to expand the time duration of the played back data frames to their original time duration prior to being recorded by decreasing the frequency of the played back data bits from the fixed frequency to their original frequency as received for recording; and means to reconstruct the format of the data bits to a serialized stream of pulse code modulated data bits at their original frequency before being recorded.

11. The system of claim 10 wherein the means to expand the time duration of the played back data frames comprises:

a first shift register for receiving serially the played back data frames at the fixed frequency;

a data buffer connected to receive in parallel the contents of the first shift register; and a second shift register connected to receive the contents of the second shift register in parallel at the original frequency of the data bits before being recorded and provide a serialized stream of pulse code modulated data bits at the original frequency at its output.

12. The system of claim 11 further comprising:
decoding means connected to receive the output of the second shift register to decode the played back stream of pulse code modulated data bits.

13. The system of claim 10 further comprising:
decoding means to decode the reconstructed continuous serialized stream of pulse code modulated data bits.

* * * * *